US011809537B2

(12) United States Patent
Zaki et al.

(10) Patent No.: US 11,809,537 B2
(45) Date of Patent: Nov. 7, 2023

(54) METHODS AND SYSTEMS FOR EXECUTING A USER INSTRUCTION

(71) Applicant: Capital One Services, LLC, McLean, VA (US)

(72) Inventors: Zainab Zaki, Reston, VA (US); Jackson Cheek, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 105 days.

(21) Appl. No.: 16/898,520

(22) Filed: Jun. 11, 2020

(65) Prior Publication Data

US 2021/0390165 A1 Dec. 16, 2021

(51) Int. Cl.
*G06F 21/32* (2013.01)
*G06F 21/45* (2013.01)

(52) U.S. Cl.
CPC .............. *G06F 21/32* (2013.01); *G06F 21/45* (2013.01)

(58) Field of Classification Search
CPC ................................ G06F 21/31; G06F 21/45
USPC ........................................................ 726/19
See application file for complete search history.

(56) References Cited

U.S. PATENT DOCUMENTS

| | | | |
|---|---|---|---|
| 9,032,491 B2* | 5/2015 | Rodriguez | G06F 21/32 726/5 |
| 10,114,935 B2* | 10/2018 | Das | H04L 63/0861 |
| 10,341,377 B1* | 7/2019 | Dell'Amico | H04L 63/1433 |
| 10,356,120 B1* | 7/2019 | Raviv | H04L 63/083 |
| 10,715,552 B2* | 7/2020 | Tsironis | H04L 63/20 |
| 10,904,289 B2* | 1/2021 | Tsironis | H04L 63/20 |
| 11,233,788 B1* | 1/2022 | Hitchcock | G06F 21/32 |
| 2013/0063581 A1* | 3/2013 | Komatsu | G06V 40/50 348/E7.085 |
| 2014/0331060 A1* | 11/2014 | Hayton | G06F 21/32 713/185 |
| 2016/0044011 A1* | 2/2016 | Gordon | H04L 63/102 726/6 |
| 2016/0105801 A1* | 4/2016 | Wittenberg | H04W 4/021 455/411 |
| 2016/0191563 A1* | 6/2016 | Beauchesne | G06F 21/554 726/25 |
| 2016/0248798 A1* | 8/2016 | Cabrera | H04L 63/1425 |
| 2016/0300242 A1* | 10/2016 | Truong | G01S 19/13 |

(Continued)

*Primary Examiner* — Kambiz Zand
*Assistant Examiner* — Mahabub S Ahmed
(74) *Attorney, Agent, or Firm* — Bookoff McAndrews, PLLC (57) ABSTRACT

A computer-implemented method for executing a user instruction may include obtaining identification data of a user via a device associated with the user, wherein the identification data comprises at least a password, a user name, and biometric data of the user; determining, via the one or more processors, a login status based on the identification data; demonstrating, to the user, historical account data based on the login status, wherein the historical account data comprises at least historical biometric data associated with one or more historical logins; receiving, via the one or more processors, the user instruction based on the historical account data, wherein the user instruction comprises at least one of revoking a historical login, changing password, or signing out a historical device associated with a historical login of the one or more historical logins; and executing, via the one or more processors, the user instruction.

20 Claims, 6 Drawing Sheets

(56) References Cited

U.S. PATENT DOCUMENTS

| | | | |
|---|---|---|---|
| 2017/0111317 A1* | 4/2017 | Glazemakers | H04L 41/0803 |
| 2017/0295159 A1* | 10/2017 | Arora | G06F 21/6218 |
| 2018/0032722 A1* | 2/2018 | Carlson | H04L 63/1425 |
| 2018/0077187 A1* | 3/2018 | Garman | G06F 16/951 |
| 2018/0124082 A1* | 5/2018 | Siadati | G06N 5/047 |
| 2018/0316727 A1* | 11/2018 | Tsironis | H04L 63/0263 |
| 2019/0042716 A1* | 2/2019 | Kaga | H04L 9/3231 |
| 2019/0109875 A1* | 4/2019 | Urmanov | G06F 21/316 |
| 2019/0116172 A1* | 4/2019 | Caldwell | H04L 67/53 |
| 2020/0193443 A1* | 6/2020 | Piel | G06Q 20/02 |
| 2021/0157945 A1* | 5/2021 | Cobb | H04L 63/0227 |
| 2022/0046023 A1* | 2/2022 | Friend | H04L 63/107 |

\* cited by examiner

◀ BACK

SECURITY                                                                    ⓐ DAVE ⌄

SIGN IN         USERNAME                                              ✎
                DAVE.DOE

PASSWORD                                              ✎
                ************

DEVICE HISTORY  ☑ CHROME ON MAC
                  DEVICE INFO              MAC OS X MAC INTEL - 10.13.6
                  BROWSER INFO             CHROME - 68
                  LOCATIONS USED           RICHMOND, VA, USA SEP 16, 2018 AT 02:48 AM EST
                                           ASHBURN, VA, USA SEP 12, 2018 AT 11:32 AM EST
                  BIOMETRIC FINGERPRINT    DAVE'S RIGHT FOREFINGER

☐ APP ON iOS
                  DEVICE INFO              IPHONE - IOS 11.4.1
                  DEVICE NICKNAME          RYAN'S WORK PHONE
                  LOCATIONS USED           RICHMOND, VA, USA SEP 14, 2018 AT 12:28 AM EST
                                           ASHBURN, VA, USA SEP 09, 2018 AT 09:22 AM EST
                                           SHOW MORE LOCATIONS
                  BIOMETRIC FINGERPRINT    DAVE'S RIGHT THUMB

☐ SAFARI ON iOS
                  DEVICE INFO              IPHONE - IOS 11.4.1
                  BROWSER INFO             SAFARI - 12.0
                  LOCATIONS USED           RICHMOND, VA, USA AUG 05, 2018 AT 10:17 AM EST
                  BIOMETRIC FINGERPRINT    NOT AVAILABLE

LINKED APPS     NO EXTERNAL APPS HAVE ACCESS TO YOUR ACCOUNT

METHODS AND SYSTEMS FOR EXECUTING A USER INSTRUCTION

TECHNICAL FIELD

Various embodiments of the present disclosure relate generally to executing a user instruction, and, more particularly, to executing a user instruction based on identification data or historical account data of the user.

BACKGROUND

A man-in-the-middle attack (MIMA) may involve an attacker (e.g., a fraudulent user) secretly relaying, and possibly altering, communications between two parties (an authorized device and a computer system associated with the authorized device). In some instances, an attacker may obtain the location and configuration of the authorized device, and may use this obtained location and configuration information to make a fraudulent device appear like the authorized device.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for executing a user instruction.

In an aspect, a computer-implemented method for executing a user instruction may include obtaining, via one or more processors, identification data of a user via a device associated with the user, wherein the identification data includes at least a password, a user name, and biometric data of the user; determining, via the one or more processors, a login status based on the identification data; demonstrating, to the user, historical account data based on the login status, wherein the historical account data includes at least historical biometric data associated with one or more historical logins; receiving, via the one or more processors, the user instruction based on the historical account data, wherein the user instruction includes at least one of revoking a historical login, changing password, or signing out a historical device associated with a historical login of the one or more historical logins; and executing, via the one or more processors, the user instruction.

In another aspect, a computer-implemented method for executing a user instruction my include obtaining, via one or more processors, identification data associated with an account, wherein the identification data includes at least one of a password, a user name, or biometric data; determining, via the one or more processors, a login status based on a comparison between the identification data and historical account data via a trained machine learning algorithm; transmitting, via the one or more processors, a notification to a device associated with a user associated with the account based on the login status, wherein the notification includes the identification data and the historical account data, wherein the historical account data includes at least historical biometric data associated with one or more historical logins; receiving, via the one or more processors, the user instruction via the device associated with the user in response to the notification, wherein the user instruction includes at least one of revoking a historical login, changing password, or signing out a historical device associated with a historical login of the one or more historical logins; and executing, via the one or more processors, the user instruction.

In yet another aspect, a computer system for executing a user instruction may include a memory storing instructions; and one or more processors configured to execute the instructions to perform operations. The operations may include obtaining identification data of a user via a device associated with the user, wherein the identification data includes at least a password, a user name, and biometric data of the user; determining a login status based on the identification data; demonstrating, to the user, historical account data based on the login status, wherein the historical account data includes at least historical biometric data associated with one or more historical logins; receiving the user instruction based on the historical account data, wherein the user instruction includes at least one of revoking a historical login, changing password, or signing out a historical device associated with a historical login of the one or more historical logins; and executing the user instruction.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as identification data or historical account data may be used to determine a user instruction.

Figure 1:
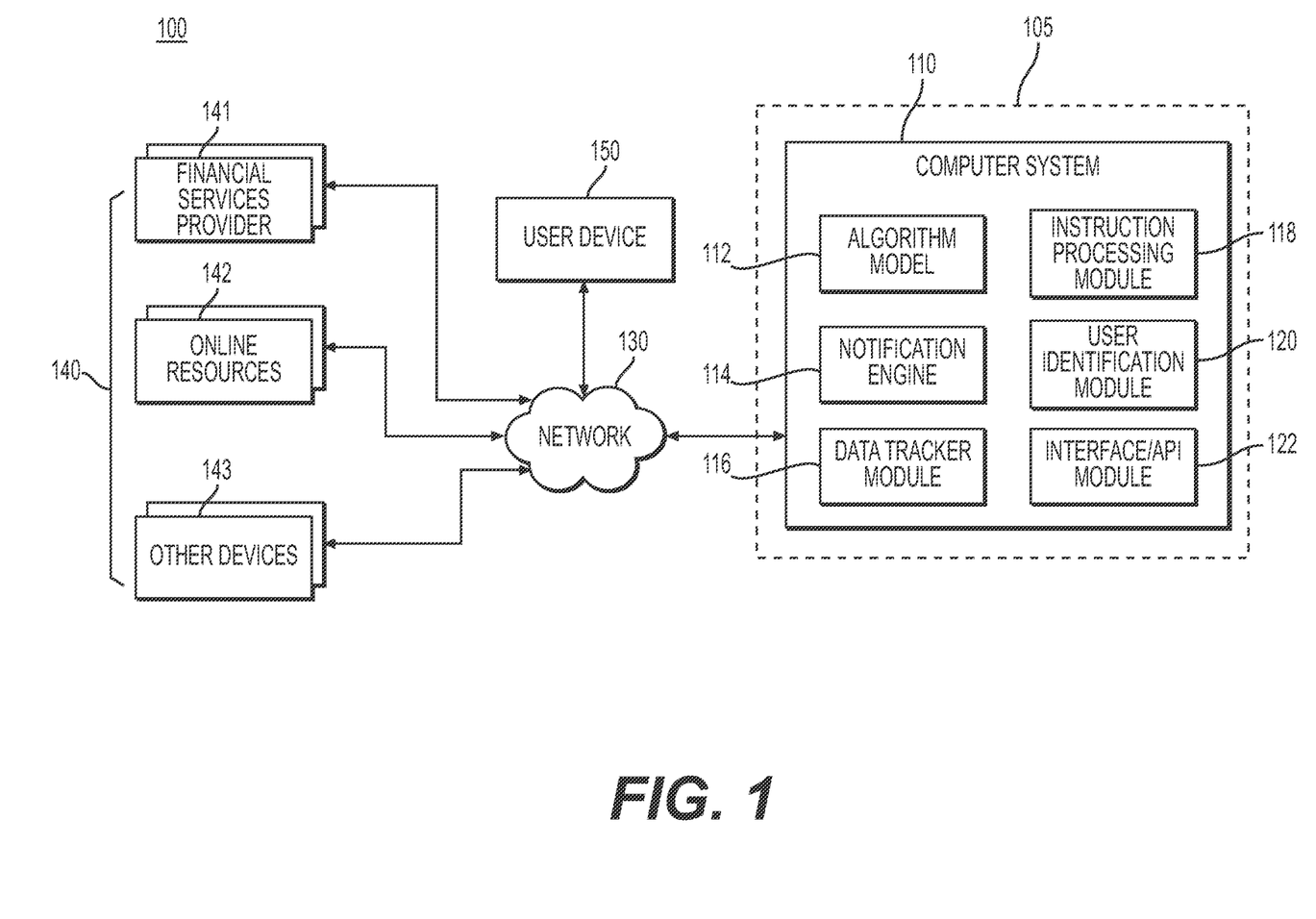
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources for collecting data (e.g., identification data, historical account data, or pre-stored identification data) 140, and a user device 150. The one or more resources for collecting data 140 may include financial services providers 141, online resources 142, and other devices 143. These components may be connected to one another, or otherwise in communication with one another, via the network 130.

The computer system 110 may have one or more processors configured to perform methods described in this disclosure. The computer system 110 may include one or more modules, models, or engines. The one or more modules, models, or engines may include an algorithm model 112, a notification engine 114, a data tracker module 116, an instruction processing module 118, a user identification module 120, and/or an interface/API module 122, which may each be software components stored in/by the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model (or a machine learning model). Details of algorithm model 112 are described elsewhere herein. The notification engine 114 may be configured to generate and communicate (e.g., transmit) one or more notifications to a user device 150 through the network 130. The data tracker module 116 may be configured to monitor, track, clean, process, or standardize data (e.g., identification data, historical account data) received in/by the computer system 110. One or more algorithms may be used to clean, process, or standardize the data. The instruction processing engine 118 may be configured to monitor, track, process, execute, or store a user instruction. Details of the user instruction are described elsewhere herein. The user identification module 120 may manage identification data for each user accessing the computer system 110, possibly including, but not limited to, user names, passwords, biometric data, contact information, social security number, or any additional information pertaining to the user. In one implementation, the identification data associated with each user may be stored to, and retrieved from, the one or more resources 140, a user device 150, and/or one or more components of the data storage associated with the computer system 110. The interface/API module 122 may allow the user or a fraudulent user to interact with one or more modules, models, or engines of the computer system 110.

Computer system 110 may be configured to receive data from other components (e.g., financial services providers 141, online resources 142, other devices 143, and/or a user device 150) of the system environment 100 through network 130. Computer system 110 may further be configured to utilize the received data by inputting the received data into the algorithm model 112 to produce a result. Information indicating the result (e.g., login status) may be transmitted to a user device 150 over the network 130. In some examples, the computer system 110 may be referred to as a server system that provides a service including providing the information indicating the result to a user device 150.

Network 130 may be any suitable network or combination of networks and may support any appropriate protocol suitable for communication of data to and from the computer system 110. Network 130 may include a public network (e.g., the Internet), a private network (e.g., a network within an organization), or a combination of public and/or private networks. The network 130 may include one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio.

Financial services providers 141 may be any entity such as a bank, credit card issuer, merchant services provider, or other type of financial service entity. In some examples, financial services providers 141 may include one or more merchant services providers that provide merchants with the ability to accept electronic payments, such as payments using credit cards and debit cards. Therefore, financial services providers 141 may collect and store credit information, transaction/purchasing information, and/or user instructions. The financial services providers 141 may each include one or more computer systems configured to gather, process, transmit, and/or receive data. In general, whenever any of financial services providers 141 is described as performing an operation of gathering, processing, transmitting, or receiving data, it is understood that such operation may be performed by a computer system thereof. In general, a computer system may include one or more computing devices, as described in reference to FIG. 6 below.

Online resources 142 may include webpage, e-mail, apps, or social network sites. Online resources 142 may be provided by financial service providers, merchants, manufacturers, retailers, and other entities. Online resources 142 may include other computer systems, such as web servers, that are accessible by computer system 110. The online resources 142 may be configured to provide any information regarding a user.

Other devices 143 may include any device that a user or a fraudulent user uses to access a user account. In some examples, the other devices 143 may be different from user device 150 and used by a fraudulent user. In such an arrangement, the user may not use the other devices 143 to access the user account but a fraudulent user may try to use the other devices to access a user account. In some embodiments, the user device 150 may be included within (e.g., is one of) the other devices 143. Other devices 143 may operate a client program, also referred to as a user application. Other devices 143 may be an electronic mobile device (e.g., smartphone, tablet, pager, personal digital assistant (PDA)), a computer (e.g., laptop computer, desktop computer, server), or a wearable device (e.g., smartwatches). Other devices 143 can also include any other device capable of providing or rendering data. Other devices 143 may optionally be portable. Other devices 143 may be handheld. Other devices 143 may be a network device capable of connecting to a network, such as the network 130, or other networks such as a local area network (LAN), wide area network (WAN) such as the Internet, a telecommunications network, a data network, or any other type of network. The user account can be dedicated to, and/or owned by, the user. User-specific information (e.g., name, e-mail address, organization, etc.) can be associated with the user account. Access to the user account can be protected by associating user credentials (e.g., identification data such as a username and accompanying password) of the user to the user account, and requiring provision of the user credentials when a user requests access to the user account. The user account can be stored in a memory storage and/or a database of a server of the computer system 110.

User device 150 (or a device associated with the user) may operate a client program, also referred to as a user application, used to communicate with the computer system 110. This user application may be used to provide information to the computer system 110 and to receive information from the computer system 110. In some examples, the user application may be a mobile application that is run on the user device 150. User device 150 may be configured to receive or transmit identification data or user instruction of the user. User device 150 may be associated with interface/API module 122 of computer system 110. User device 150 may be an electronic mobile device (e.g., smartphone, tablet, pager, personal digital assistant (PDA)), a computer (e.g., laptop computer, desktop computer, server), or a wearable device (e.g., smartwatches). User device 150 can also include any other device capable of providing or rendering data. User device 150 may optionally be portable. User device 150 may be handheld. User device 150 may be a network device capable of connecting to a network, such as the network 130, or other networks such as a local area network (LAN), wide area network (WAN) such as the Internet, a telecommunications network, a data network, or any other type of network. User device 150 may be utilized to obtain identification of the user and/or authenticate the user.

Computer system 110 may be part of entity 105, which may be any type of company, organization, or institution. In some examples, the entity 105 may be a financial services provider 141. In such examples, the computer system 110 may have access to data pertaining to the user through a private network within the entity 105. For example, if the entity 105 is a card issuer, entity 105 may collect and store identification data or historical account data involving a credit card or debit card issued by the entity 105. In such examples, the computer system 110 may still receive identification data or historical account data from other financial services providers 141.

Figure 2:
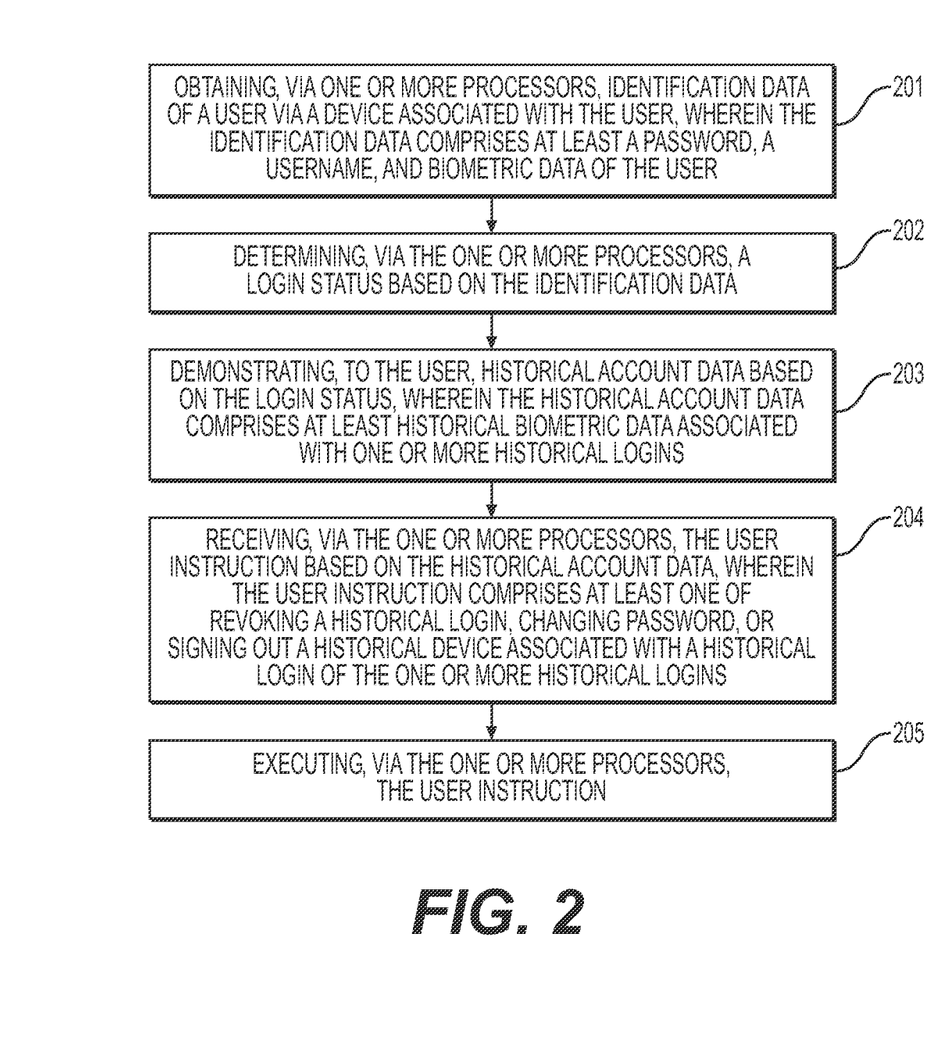
FIG. 2 depicts a flowchart of an exemplary method of executing a user instruction, according to one or more embodiments.

FIG. 2 is a flowchart illustrating a method for executing a user instruction, according to one or more embodiments of the present disclosure. The method may be performed by computer system 110.

Step 201 may include obtaining, via one or more processors, identification data of a user via a device associated with the user. The identification data may include at least a password, a user name, and biometric data of the user. The biometric data of the user may include any information related to human characteristics of the user. The biometric data may include physiological information such as a fingerprint, palm veins, face recognition, DNA, palm print, hand geometry, iris recognition, retina, and/or odor/scent. The biometric data may also include behavioral characteristics related to the pattern of behavior of the user, including but not limited to typing rhythm, gait, or voice. The identification data of the user may further include an actual name, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user.

Step 202 may include determining, via the one or more processors, a login status based on the identification data. The login status of the user may represent whether a user can log in or access a user account based on the identification data. The login status of the user may include a registered customer status or a non-registered customer status. The registered customer status may include a new customer status or a returned customer status. The registered customer status may enable the user to access the user account or any information associated with the user account. The non-registered customer status may not enable the user to access the user account or any information associated with the user account. The determining the login status of the user may include analyzing the identification data of the user. The analyzing the identification of the user may be performed by the user identification module 120 of the computer system 110. The user identification module 120 may analyze identification data for each user accessing the computer system 110. The identification data may be stored to, and retrieved from, one or more components of data storage or a memory system of the computer system 110. The analyzing the identification of the user may include obtaining pre-stored identification data from a database associated with one or more resources 140 and/or comparing the identification data with the pre-stored data.

The pre-stored identification data may include at least a pre-stored password, a pre-stored user name, and pre-stored biometric data of the user. The pre-stored identification may further include any information that a user provides to an authentication system, a transactional entity, or a transaction system, including, a pre-stored actual name, pre-stored contact information (e.g., address, phone numbers, e-mail addresses, etc.), a pre-stored social security number, pre-stored biometric data, and additional information pertaining to the user. The additional information may include pre-stored user preference information, pre-stored demographic information (e.g., age, gender, marital status, income level, educational background, number of children in household, etc.), and other data related to the user. Details of the biometric data are described elsewhere herein.

The determining the login status may include comparing the identification data with pre-stored identification data. The determining step may be initiated when the identification data of the user is obtained via the device associated with the user (user device 150). One or more algorithms may be used to compare the identification data of the user to pre-stored identification data and determine whether there is a match (e.g., a complete match or a match equal to or exceeding a predetermined threshold of similarity) between the identification data of the user and pre-stored identification data. If the pre-stored identification data matches the identification data, then the user may be a registered customer and may be allowed to access the user account. For instance, a fingerprint of the identification data obtained via a device associated with the user (e.g., user device 150) may be compared with a fingerprint of the pre-stored identification data to see whether there is a match. In this situation, if there is a match (e.g., a complete match or a match equal to or exceeding a predetermined threshold of similarity) between these two fingerprints, then the user may be a registered customer and may be allowed to access the user account. Accessing the user account may be permitted to be completed, may be stopped, or may require additional verification processes to occur, based on whether there is a match between the identification data of the user and pre-stored identification data.

The pre-stored identification data may be generated when a user device 150 is registered with a transaction system, an authentication system, or a transactional entity. In other embodiments, the pre-stored identification data may be generated when a user device 150 first connects with a transaction system, an authentication system, or a transactional entity (e.g., a financial service provider 141, a merchant). If the user device is an electronic mobile device, the pre-stored identification may be generated when a mobile application for authenticating identification is downloaded, installed, or running on the user device 150 for the first time. The pre-stored identification data may be generated when a user account is registered with a transaction system, an authentication system, or a transaction entity, and the pre-stored identification may correspond to the user device used for registration of the user account. Once the pre-stored identification has been generated, it may be stored with other user account information and/or authentication information. The pre-stored identification data may be stored in one or more memory units, cookies, caches, browsing histories, and/or browser fingerprints. The pre-stored identification data may be stored in a memory on-board the user device 150. The pre-stored identification data may be distributed over multiple devices or systems (e.g., peer-to-peer, cloud-computing based infrastructure, etc.).

Step 203 may include demonstrating, to the user, historical account data based on the login status. The historical account data may include at least a password, a user name, and/or biometric data associated with one or more historical logins. The historical account data may further include an actual name, contact information (e.g., address, phone numbers, e-mail addresses, etc.), a social security number, and additional information associated with one or more historical logins. The additional information may include user preference information, demographic information (e.g., age, gender, marital status, income level, educational background, number of children in household, etc.), employment, and other data related to the user. The historical account data may include at least historical biometric data associated with one or more historical logins. The historical biometric data associated with one or more historical logins may include any information associated with one or more historical logins related to human characteristics of the user or anyone who accesses the user account. The historical biometric data may include physiological information such as a fingerprint, palm veins, face recognition, DNA, palm print, hand geometry, iris recognition, retina and/or odor/scent. The historical biometric data may also include behavioral characteristics related to the pattern of behavior of the user or anyone who accesses the user account, including but not limited to typing rhythm, gait, or voice. The historical biometric data may further include historical biometric behavior data. The historical biometric behavior data may include a pattern of providing historical biometric data of the user or anyone who accesses the user account. For instance, the historical account data may include at least one of a fingerprint or a pattern of providing a fingerprint (e.g., always providing the fingerprint of the right thumb) of the user or anyone who accesses the user account. The one or more historical logins may include at least one example of a person other than the user (e.g., a fraudulent user) logging into (or attempting to log into) the user account. The one or more historical logins may include all the historical logins that a user or a person other than the user performs to access the user account. In some embodiments, however, the one or more historical logins may include only a portion of the historical logins that a user or a person other than the user performs to access the user account.

The historical account data may include at least one of historical device data, a timestamp, or a location associated with the one or more historical logins. The historical device data may include at least one of a device type, a device name, or browser data associated with the one or more historical logins. The historical device data may include any information regarding the historical device. The device type may include an electronic mobile device (e.g., smartphone, tablet, pager, personal digital assistant (PDA)), a computer (e.g., laptop computer, desktop computer, server), or a wearable device (e.g., smartwatches). The device name may include the brand name, marketing name, or nickname of the device. The browser data may include any information related a user interface (e.g., a website, an app) through which a login is performed. The timestamp associated with the one or more historical logins may include any information regarding the time associated with the one or more historical logins, including, but not limited to, the exact time associated with the one or more historical logins or a duration of time associated with the one or more historical logins (e.g., how long the historical login took). The location associated with the one or more historical logins may include any information regarding the geographic location associated with the one or more historical logins. The geographic location associated with the one or more historical logins may be identified via a device associated with the user (e.g., user device 150) or other devices (e.g., other devices 143) associated with the one or more historical logins. Such a device may include memory storage that stores a geographic location, for example, periodically.

Figure 3:
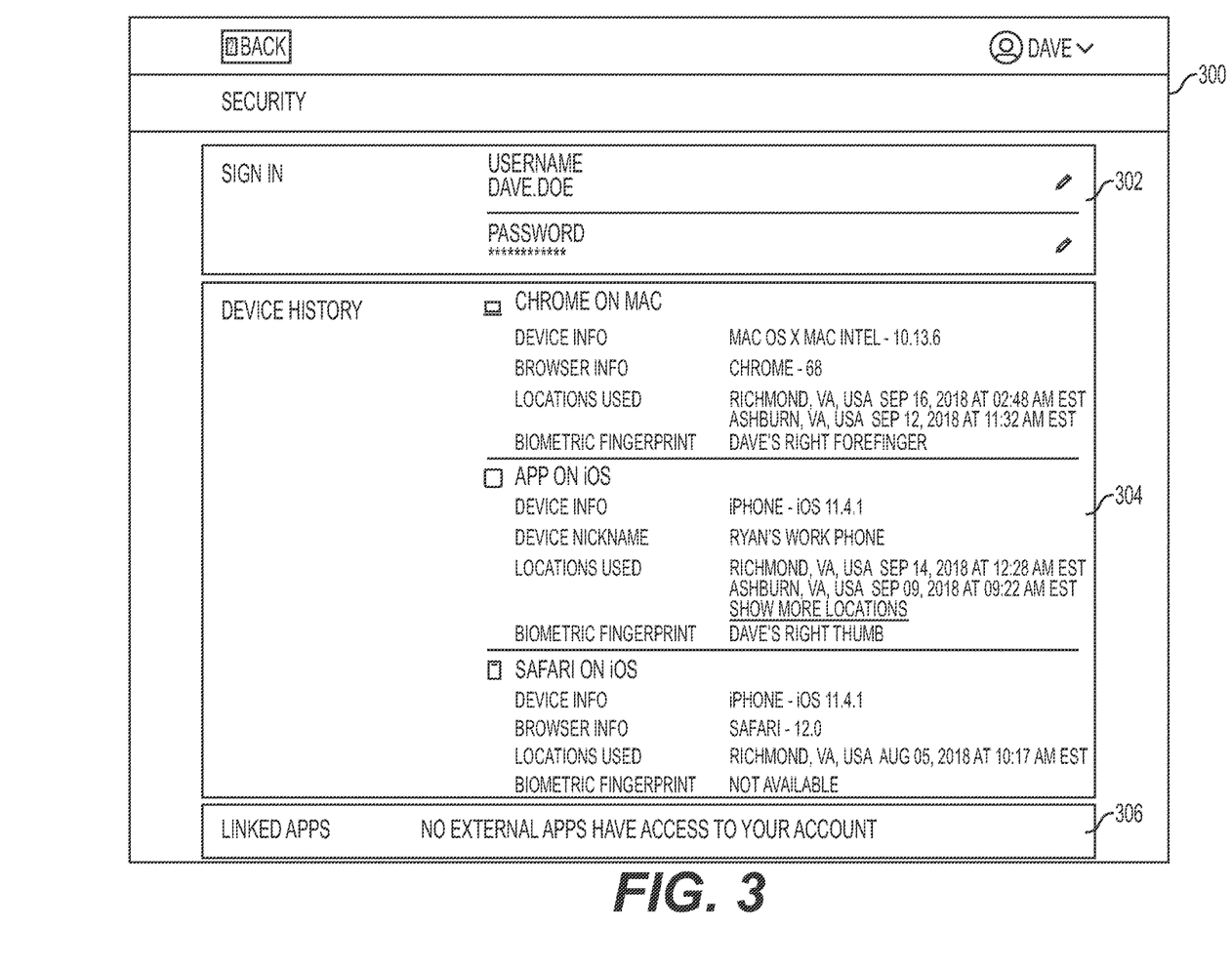
FIG. 3 depicts a graphical representation of an exemplary user interface provided on a user device, according to one or more embodiments.

FIG. 3 illustrates a graphical representation of an exemplary user interface provided on the user device 150 of FIG. 1 when demonstrating, to the user, historical account data based on the login status. In this example, the user device 150 may be a laptop executing a website 300. The website 300 including the historical account data may be displayed to the user after a login status of the user is determined and the user is able to access the user account based on the login status. In other embodiments, the information illustrated in FIG. 3 may be presented in a different format via software executing on an electronic device (e.g., a desktop, mobile phone, or tablet computer) serving as the user device 150.

The website 300 may include one or more layouts. The one or more layouts may include a login layout 302, a historical account layout 304, and/or a supplementary layout 306. The login layout 302 may present any information regarding the identification data of the user or the login status. The information regarding the identification data may include any identification data that the user uses to log in to the user account. In this example, the login layout 302 may include the user name and a password. The historical account layout 304 may present any information regarding the historical account data or identification data associated with the one or historical logins. In this example, the historical account layout 304 may include historical device data (e.g., "IPhone—iSO 11.4.1," "Dave's Work phone"), a timestamp (e.g., "Sep. 14, 2018 at 12:28 AM EST), a location (e.g., "Richmond, Va., USA"), or identification data (e.g., "Dave's Right Thumb") associated with the one or more historical logins. The supplementary layout 306 may present any additional information regarding the user account. The additional information regarding the user account may include, but is not limited to, description of the website 300 or the user account, the contact information associated with the website 300, and/or apps or external websites linked to the website 300. In this example, the supplementary layout 306 indicates that no external apps have access to the user account. Additionally, the user interface may include one or more graphical elements, including, but not limited to, input controls (e.g., checkboxes, radio buttons, dropdown lists, list boxes, buttons, toggles, text fields, date field), navigational components (e.g., breadcrumb, slider, search field, pagination, slider, tags, icons), informational components (e.g., tooltips, icons, progress bar, notifications, message boxes, modal windows), or containers (e.g., accordion).

Returning to FIG. 2, step 204 may include receiving, via the one or more processors, the user instruction based on the historical account data. The receiving the user instruction may include receiving the user instruction through one or more interactive activities of the user with the device associated with the user. The device associated with the user may be capable of accepting inputs of a user via one or more interactive components of the user device, such as a keyboard, button, mouse, touchscreen, touchpad, joystick, trackball, camera, microphone, or motion sensor input (e.g., an input device 650 as described in connection with FIG. 6, below). One or more user interfaces (e.g., as shown in FIG. 3) may interact with the user to collect the user instruction. For instance, the user may type the name or the user instruction via a keyboard provided on the display of the device associated with the user. In another example, the user may click on one or more selections displayed on a display of the user device. The one or more selections may be in a form of a link, button, or hyperlink.

The user instruction may include least one of revoking a historical login, changing password, or signing out a historical device associated with a historical login of the one or more historical logins. The user instruction may include any interaction that the user may perform regarding a historical login, including, but not limited to, updating a list of authorized historical devices (e.g., devices that the user authorizes for future logins), or updating identification data of the user. For instance, after a user logs in to the user account, the user may not recognize one or more suspicious historical logins (e.g., the user may consider that such historical logins are logins performed by fraudulent users) displayed on the device associated with the user (e.g., as shown in historical account layout 304 of FIG. 3). The user may sign out historical devices associated with the one or more suspicious historical logins. In another example, after a user logs in to the user account, the user may recognize the one or more historical logins associated with a new device displayed on the device associated with the user (e.g., as shown in historical account layout 304 of FIG. 3), and the user may update a list of authorized historical devices to include such new device. The user instruction may be determined by the user after viewing the historical account data. The user instruction may also be determined automatically via one or more algorithms.

Step 205 may include executing, via the one or more processors, the user instruction. There may be steps of receiving a secondary confirmation from the user via the device associated with the user. A secondary confirmation request may be presented to the user on the display of the user device. The secondary confirmation may include any information regarding a request to a user to confirm that the user instruction may be executed. The secondary confirmation may be provided by a user via one or more interactive activities with the device associated with the user. Details of the one or more interactive activities are described elsewhere herein.

At any stage of executing a user instruction, the method may further including storing the identification data, login status, historical account data, or the user instruction for subsequent analysis. The stored data may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the user instruction to update the identification data, the login status, or the historical account data of the user. The stored data may also be one of the one or more variables used in training a trained machine learning model. Details of the trained machine learning model are described elsewhere herein.

Figure 4:
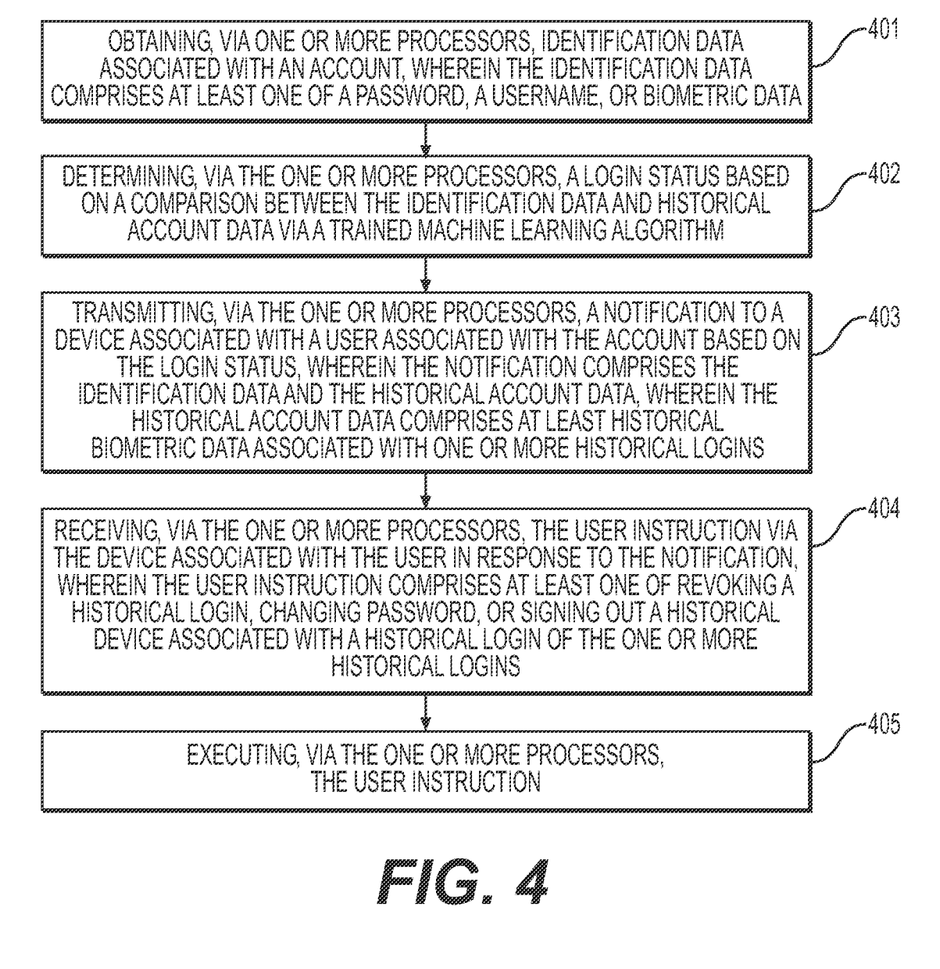
FIG. 4 depicts a flowchart of another exemplary method of executing a user instruction, according to one or more embodiments.

FIG. 4 is a flowchart illustrating another exemplary method for executing a user instruction, according to one or more embodiments of the present disclosure. The method may be performed by computer system 110.

Step 401, similarly to step 201 of FIG. 2, may include obtaining, via one or more processors, identification data associated with an account. The identification data may include at least one of a password, a user name, or biometric data associated with an account. Such identification data may be or may not be provided by the user. If the identification data is not provided by the user, the identification data may be provided by a fraudulent user. The biometric data associated with an account may include any information related to human characteristics provided by the person (including the user) seeking access to the account (or user account). The biometric data associated with an account may include physiological information such as a fingerprint, palm veins, face recognition, DNA, palm print, hand geometry, iris recognition, retina or odor/scent. The biometric data may also include behavioral characteristics related to the pattern of behavior associated with an account, including but not limited to typing rhythm, gait, or voice. The identification data may include an actual name, a username, passwords, contact information (e.g., address, phone numbers, e-mail addresses, etc.), a social security number, and additional information pertaining to the person seeking access to the account (or user account). The additional information may include user preference information, demographic information (e.g., age, gender, marital status, income level, educational background, number of children in household, etc.), employment, and other data related to the person seeking access to the account (or user account).

Step 402 may include determining, via the one or more processors, a login status based on a comparison between the identification data and historical account data via a trained machine learning algorithm. Details of the trained machine learning algorithm are described elsewhere herein. Details of the login status are described elsewhere herein. The determining the login status may include analyzing the identification data associated with the account. The analyzing the identification data may be performed by user identification module 120 of the computer system 110. The user identification module 120 may analyze identification data for each person accessing the account or computer system 110. The identification data may be stored to, and retrieved from, one or more components of data storage or a memory system of the computer system 110. The historical account data may include pre-stored identification data. Details of pre-stored identification data and historical account data are described elsewhere herein.

The determining the login status may include comparing the identification data with historical account data. The determining step may be initiated when the identification data is obtained via a user device 150 or other devices 143. During the determining step, one or more algorithms (e.g., trained machine learning algorithm) may be used to compare the identification data to historical account data and determine whether there is a match (e.g., a complete match or a match equal to or exceeding a predetermined threshold of similarity) between the identification data and historical account data. If the historical account data matches the identification data, then the person seeking access to the account (or user account) may be allowed to be logged in to the account. For instance, a fingerprint of the identification data obtained may be compared with a fingerprint of the historical account data to see whether there is a match. In this situation, if there is a match (e.g., a complete match or a match equal to or exceeding a predetermined threshold of similarity) between these two fingerprints, then person seeking access to the account (or user account) may be able to access the user account. In another example, a fingerprint of the identification data may be obtained via a device (e.g., other device 143). Such fingerprint, however, may not match the fingerprint of the historical account data. In this situation, the user account may not allow the person seeking access to log in the account (or user account). In yet another example, a user may attempt to enter a username and/or password of the identification data via a device, but the historical account data may indicate that the user typically logs in to the user account via his/her fingerprint. In this situation, although the password obtained via the device may match the password stored as the historical account data, the user account may not allow the login by the person seeking access to the account (or user account) since password logins do not match a pattern of historical logins of the user. Accessing the user account may be permitted to be completed, may be stopped, or may require additional verification processes, based on whether there is a match between the identification of the user and a pre-stored identification.

Step 403 may include transmitting, via the one or more processors, a notification to a device associated with a user (e.g., user device 150) associated with the account based on the login status. The notification may include the identification data and the historical account data. The notification may be configured to be displayed on a display screen of a user device, e.g., user device 150. The notification may be displayed on the display screen in any suitable form, such as an e-mail, a text message, a push notification, content on a web page, and/or any form of graphical user interface. The user device 150 may be capable of accepting inputs of a user via one or more interactive components of the user device, such as a keyboard, button, mouse, touchscreen, touchpad, joystick, trackball, camera, microphone, or motion sensor input (e.g., an input device 650 as described in connection with FIG. 6, below). In some examples, step 403 may occur in response to a trigger event. The trigger event may include any information regarding a historical login or current login. For example, the notification engine 114 may detect a trigger condition that a suspicious login occurs (e.g., obtained identification data does not match the historical account data), and then transmit information regarding the suspicious login to the user device 150.

The historical account data may include at least historical biometric data associated with one or more historical logins. The historical biometric data may include historical biometric behavior data of the user. The historical biometric behavior data may include at least one of a fingerprint or a pattern of providing a fingerprint of the user. The pattern of providing a fingerprint of the user may include information regarding which finger of the user is associated with the fingerprint. For instance, the pattern of providing a fingerprint of the user may include a pattern that a user always provides his/her fingerprint with his/her thumb. The historical biometric behavior data may include any information regarding biometric data or a pattern of providing the biometric data by a user. For instance, the pattern of providing the biometric data by a user may include a pattern that the user always provides his/her voice by repeating his/her phone number.

The historical account data may further include at least one of a historical password or a historical user name of the user. The historical password or the historical user name of the user may be associated with one or more historical logins. In some embodiments, the historical password or the historical user name of the user may be the pre-stored password or pre-stored user name. The historical account data may include at least one of historical device data, a timestamp, or a location associated with the one or more historical logins. The historical device data may include at least one of a device type, a device name, or browser data associated with the one or more historical logins. Details of the historical device data, a timestamp, or a location associated with the one or more historical logins are described elsewhere herein. The historical account data may further include historical login behavior data of the user. The historical login behavior data may be any information regarding a user's behavior of historical logins, including, but not limited to, user's preference of historical logins (e.g., fingerprint logins), or user's interactivities with the user account (e.g., which links in the user account that the user tends to click the most).

Prior to transmitting the notification, or at any stage of executing a user instruction, the method may further include authenticating a communication identification of the user. The communication identification of the user may include at least one of an e-mail address or a phone number of the user. The authenticating the communication identification of the user may include monitoring any change regarding the communication identification provided by the user. The communication identification may be generated when a user account is registered with a transaction system, an authentication system, or a transaction entity. The communication identification may be changed by the user. In this situation, the authenticating the communication identification of the user may include sending a verification request to the user to verify the changed communication identification prior to transmitting the notification. Once the communication identification has been verified, it may be stored with other user account information and/or authentication information. The communication identification may be stored in one or more memory units, cookies, caches, browsing histories, and/or browser fingerprints.

Step 404 may include receiving, via the one or more processors, the user instruction via the device associated with the user in response to the notification. Receiving the user instruction may include receiving the user instruction through one or more interactive activities of the user with the device associated with the user. The one or more interactive activities may include clicking on a confirmation link or button displayed on a display of the device associated with the user. The device associated with the user (e.g., user device 150) may be capable of accepting inputs of a user via one or more interactive components of the user device, such as a keyboard, button, mouse, touchscreen, touchpad, joystick, trackball, camera, microphone, or motion sensor input (e.g., an input device 650 as described in connection with FIG. 6, below). One or more user interfaces (e.g., a website) may interact with the user to collect the user instruction. For instance, the user may type the name or the user instruction via a keyboard provided on the display of the device associated with the user. In another example, the user may click on one or more selections displayed on a display of the user device. The one or more selections may be in a form of a link, button, or hyperlink.

The user instruction may include least one of revoking a historical login, changing password, or signing out a historical device associated with a historical login of the one or more historical logins. The user instruction may include any interaction that the user may perform regarding a historical login, including, but not limited to, updating a list of authorized historical devices (e.g., devices that the user authorizes for future logins), or updating identification data of the user. For instance, the user may not recognize one or more suspicious historical logins (e.g., the user may consider such historical logins as fraudulent logins) provided by the notification displayed on the device associated with the user. As such, the user may sign in the user account and sign out historical devices associated with the one or more suspicious historical logins. In another example, the user may recognize the one or more historical logins associated with a new device provided by the notification displayed on the device associated with the user. In this situation, the user may sign in to the user account and update a list of authorized historical devices to include such historical device. The user instruction may be determined by the user after viewing the notification. The user instruction may also be determined automatically via one or more algorithms.

Step 405, similar to step 205 of FIG. 2, may include executing, via the one or more processors, the user instruction. There may be steps of receiving a secondary confirmation from the user via the device associated with the user. A secondary confirmation request may be presented to the user on the display of the user device. The secondary confirmation may include any information regarding a request to a user to confirm that the user instruction may be executed. The secondary confirmation may be provided by a user via one or more interactive activities with the device associated with the user. Details of the one or more interactive are described elsewhere herein.

Figure 5:
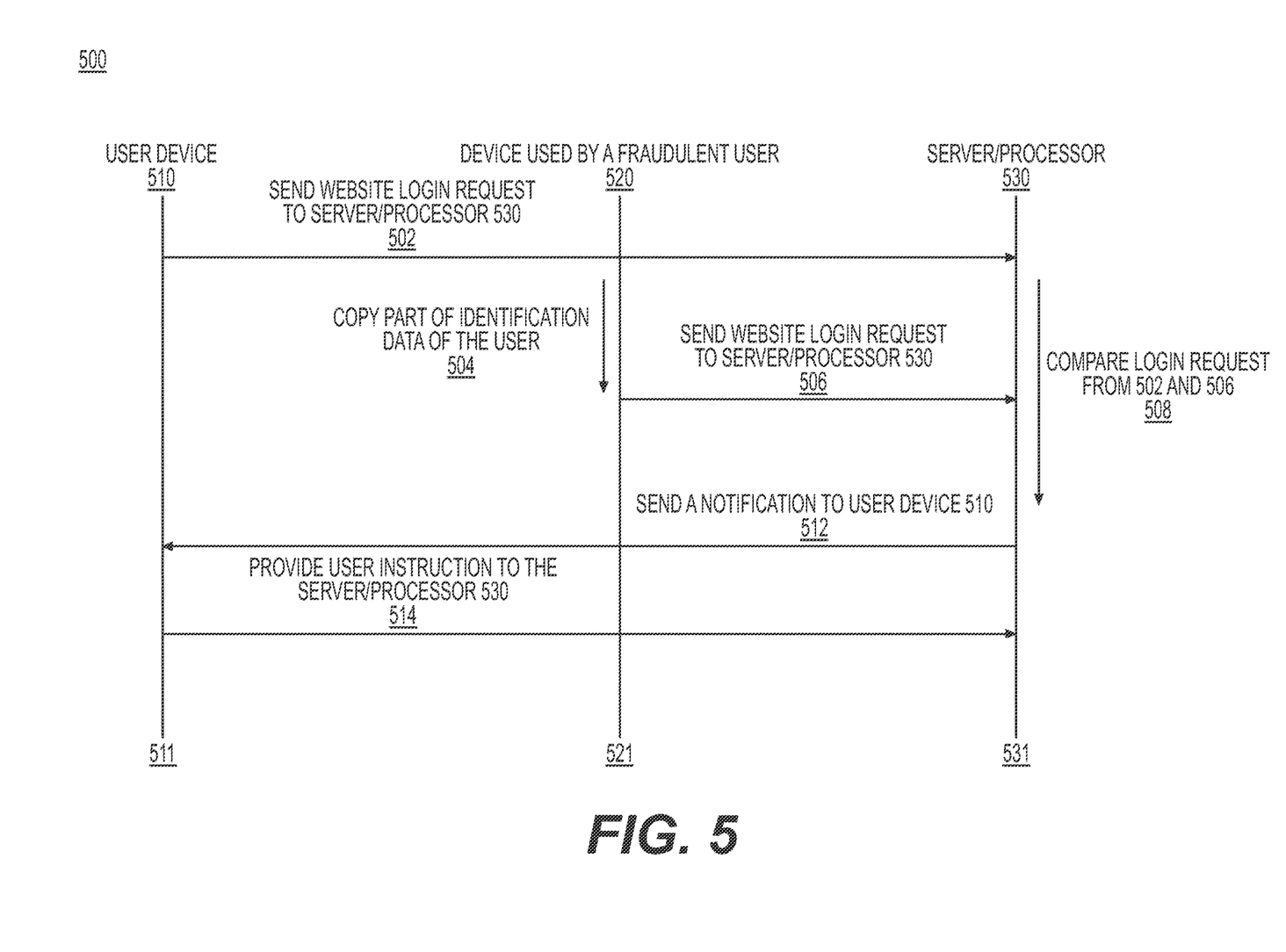
FIG. 5 illustrates another exemplary method of executing a user instruction, according to one or more embodiments.

FIG. 5 illustrates another example of the method of executing a user instruction. In FIG. 5, the process(es) carried out by or involving a user device 510 is represented by a contact with a vertical line 511, the process(es) carried out by or involving a device used by a fraudulent user 520 may be represented by a contact with a vertical line 521, and the process(es) carried out by or involving a server/processor 530 may be represented by a contact with a vertical line 531. In this example, a user may first use the user device 510 to send 502 a website login request to server/processor 530 with identification data in order to login to a user account. During a man-in-the-middle attack, a fraudulent user may use the device 520 to copy 504 part of the identification data and send 506 a login request with the copied identification data to server/processor 530 in order to login to the user account. The server/processor 530 may then compare 508 the login request (including the identification data) from the user device 510 and the login request (including the partial identification data) from the device used by a fraudulent user 520 to determine a login status and identify that the login request sent by the device 520 is a suspicious login. The server/processor 530 may then send 512 a notification to the user device 510. The user may then provide 514 user instructions via the user device 510 in response to the notification.

At any stage of executing a user instruction, the method may further include storing the identification data, login status, historical account data, or the user instruction for subsequent analysis. The stored data may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the user instruction to update the identification data, the login status, or the historical account data of the user. The stored data may also be one of the one or more variables used in training a trained machine learning model. Details of the trained machine learning model are described elsewhere herein.

The machine learning model may be a regression-based model that accepts the data identified in any steps described above as input data. The machine learning model may be of any suitable form, and may include, for example, a neural network. A neural network may be software representing a human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The machine learning model may determine the login status as a function of the identification data or historical account data or one or more variables indicated in the input data. The one or more variables may be derived from the identification data or historical account data. This function may be learned by training the machine learning model with training sets. The machine learning model may be trained by supervised, unsupervised or semi-supervised learning using training sets comprising data similar to the type of data used as the model input. For example, the training set used to train the model may include any combination of the following: the identification data of the user, the historical account data of the user, the identification data of any person other than the user, or the historical account data of any person other than the user. Accordingly, the machine learning model may be trained to map input variables to a quantity or value of login status. The login status determined by the machine learning model may be used as an additional input variable.

The trained machine learning model may utilize principal component analysis (PCA). The PCA may convert a set of variables or input data into a set of values of linearly uncorrelated variables, which include a first principal component that has the largest possible variance. For example, the identification data or historical account data may be converted to a set of variables representing other characteristics of the user. The other characteristics of the user may include user's health condition, or user's future travel plans. The PCA may be used to define one or more variables that are more important than other variables, or reduce the number of variables needed to be trained and computed by a machine learning model.

In general, any process discussed in this disclosure that is understood to be computer-implementable, such as the processes illustrated in FIGS. 2, 4 and 5, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, other devices 143, and/or user device 150, may include one or more computing devices. If the one or more processors of the computer system 110 and/or user device 150 are implemented as a plurality of processors, the plurality of processors may be included in a single computing device or distributed among a plurality of computing devices. If a computer system 110 and/or user device 150 comprises a plurality of computing devices, the memory of the computer system 110 may include the respective memory of each computing device of the plurality of computing devices.

Figure 6:
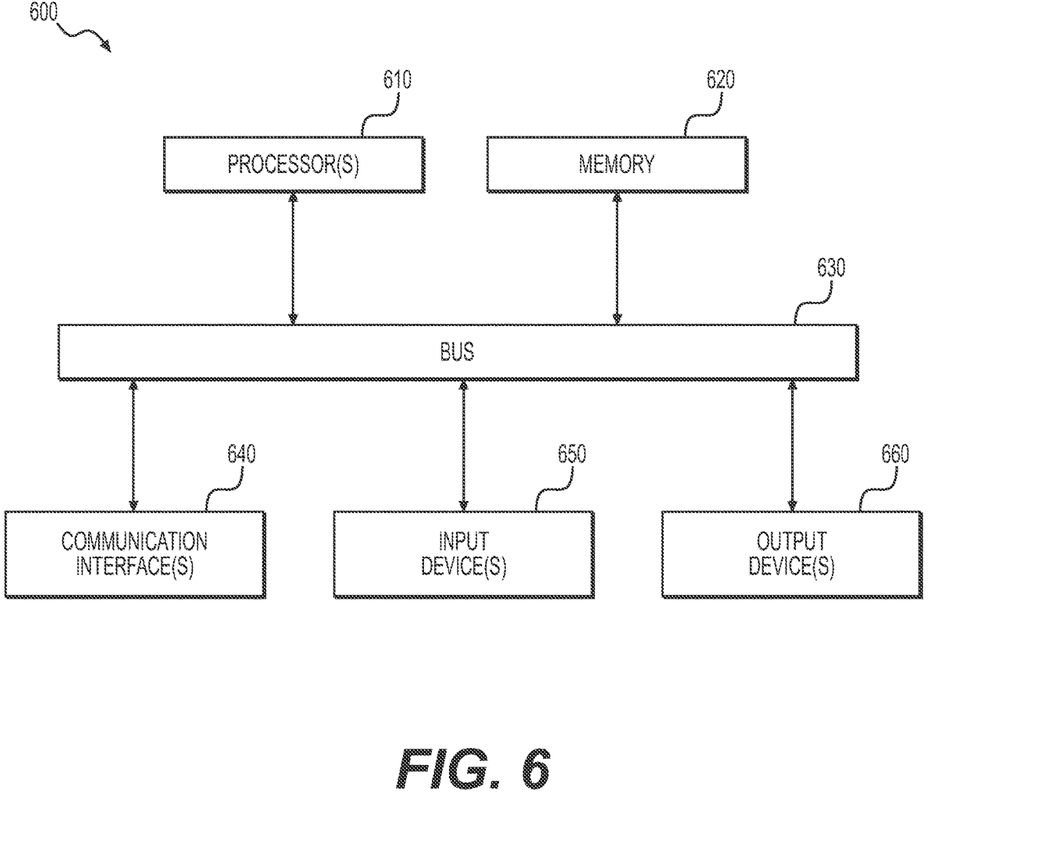
FIG. 6 depicts an example of a computing device, according to one or more embodiments.

FIG. 6 illustrates an example of a computing device 600 of a computer system, such as computer system 110, other devices 143, and/or user device 150. The computing device 600 may include processor(s) 610 (e.g., CPU, GPU, or other such processing unit(s)), a memory 620, and communication interface(s) 640 (e.g., a network interface) to communicate with other devices. Memory 620 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 620. The computing device 600 may, in some embodiments, further include input device(s) 650 (e.g., a keyboard, mouse, or touchscreen) and output device(s) 660 (e.g., a display, printer). The aforementioned elements of the computing device 600 may be connected to one another through a bus 630, which represents one or more busses. In some embodiments, the processor(s) 610 of the computing device 600 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for executing a user instruction, the method comprising:
 obtaining, via one or more processors, identification data of a user via a device associated with the user, wherein the identification data comprises at least a password, a user name, and biometric data of the user;
 determining, via the one or more processors using a machine learning algorithm, a login status based on the identification data, wherein the machine learning algorithm is trained using a training set including identification data of the user, historical account data of the user, identification data of persons other than the user, and historical account data of persons other than the user for accounts not associated with the user;
 in response to determining the login status, causing to be displayed, to the user, historical biometric data and a plurality of historical logins, wherein each item of historical biometric data corresponds to one or more historical logins, each historical login includes at least a location identifier and a device identifier, and the one or more historical logins are collectively included in historical account data;
 receiving, via the one or more processors, the user instruction based on the historical biometric data, wherein the user instruction comprises at least one of revoking a historical login, changing password, or signing out a historical device associated with a historical login of the one or more historical logins; and
 executing, via the one or more processors, the user instruction.

2. The computer-implemented method of claim 1, wherein the historical account data includes a timestamp associated with each historical login.

3. The computer-implemented method of claim 2, wherein the device identifier includes at least one of a device type, a device name, or browser data associated with each historical login.

4. The computer-implemented method of claim 1, wherein the biometric data includes a fingerprint of the user.

5. The computer-implemented method of claim 1, further including storing the identification data or the user instruction for subsequent analysis.

6. The computer-implemented method of claim 1, wherein determining the login status includes comparing the identification data with pre-stored identification data.

7. The computer-implemented method of claim 6, wherein the pre-stored identification data includes at least a pre-stored password, a pre-stored user name, and pre-stored biometric data of the user.

8. The computer-implemented method of claim 1, wherein receiving the user instruction includes receiving the user instruction through one or more interactive activities of the user with the device associated with the user.

9. A computer-implemented method for executing a user instruction, the method comprising:
 obtaining, via one or more processors, identification data associated with an account, wherein the identification data comprises at least one of a password, a user name, or biometric data;
 determining, via the one or more processors, a login status based on a comparison between the identification data and historical account data via a trained machine learning algorithm, wherein the machine learning algorithm is trained using a training set including identification data of the user, historical account data of the user, identification data of persons other than the user, and historical account data of persons other than the user for accounts not associated with the user;
 in response to determining the login status, transmitting, via the one or more processors, a notification to a device associated with a user associated with the account based on the login status, wherein the notification comprises the identification data and historical biometric data and a plurality of historical logins, wherein each item of historical biometric data corresponds to one or more historical logins, each historical login includes at least a location identifier and a device identifier, and the one or more historical logins are collectively included in the historical account data;
 receiving, via the one or more processors, the user instruction via the device associated with the user in response to the notification, wherein the user instruction comprises at least one of revoking a historical login, changing password, or signing out a historical device associated with a historical login of the one or more historical logins; and
 executing, via the one or more processors, the user instruction.

10. The computer-implemented method of claim 9, wherein the identification data includes the biometric data, wherein the biometric data includes a fingerprint of the user.

11. The computer-implemented method of claim 9, wherein the historical account data further includes at least one of a historical password or a historical user name of the user.

12. The computer-implemented method of claim 9, wherein the historical account data includes a timestamp associated with each historical login.

13. The computer-implemented method of claim 12, wherein the device identifier includes at least one of a device type, a device name, or browser data associated with each historical login.

14. The computer-implemented method of claim 9, wherein the historical biometric data includes historical biometric behavior data of the user, wherein the historical biometric behavior data includes at least one of a fingerprint or a pattern of providing a fingerprint of the user.

15. The computer-implemented method of claim 9, further including, prior to transmitting the notification, authenticating a communication identification of the user.

16. The computer-implemented method of claim 15, wherein the communication identification of the user includes at least one of an e-mail address or a phone number of the user.

17. The computer-implemented method of claim 9, wherein receiving the user instruction includes receiving the user instruction through one or more interactive activities of the user with the device associated with the user.

18. The computer-implemented method of claim 17, wherein the one or more interactive activities include clicking on a confirmation link or button displayed on a display of the device associated with the user.

19. The computer-implemented method of claim 9, further including storing the identification data or the user instruction for subsequent analysis.

20. A computer system for executing a user instruction, comprising:
 a memory storing instructions; and
 one or more processors configured to execute the instructions to perform operations including:
  obtaining identification data of a user via a device associated with the user, wherein the identification data comprises at least a password, a user name, and biometric data of the user;

determining, using a machine learning algorithm, a login status based on the identification data, wherein the machine learning algorithm is trained using a training set including identification data of the user, historical account data of the user, identification data of persons other than the user, and historical account data of persons other than the user for accounts not associated with the user;

in response to determining the login status, causing to be displayed, to the user, historical biometric data and a plurality of historical logins, wherein each item of historical biometric data corresponds to one or more historical logins and each historical login includes at least a location identifier and a device identifier;

receiving the user instruction based on the historical biometric data, wherein the user instruction comprises at least one of revoking a historical login, changing password, or signing out a historical device associated with a historical login of the one or more historical logins; and executing the user instruction.

\* \* \* \* \*